(12) United States Patent
Kojima et al.

(10) Patent No.: US 9,138,946 B2
(45) Date of Patent: Sep. 22, 2015

(54) FLAT TIRE REPAIR KIT

(75) Inventors: Yoshihide Kojima, Kobe (JP); Tsutomu Kono, Kobe (JP)

(73) Assignee: SUMITOMO RUBBER INDUSTRIES, LTD., Kobe-shi (JP)

( * ) Notice: Subject to any disclaimer, the term of this patent is extended or adjusted under 35 U.S.C. 154(b) by 136 days.

(21) Appl. No.: 13/979,438

(22) PCT Filed: Jan. 11, 2012

(86) PCT No.: PCT/JP2012/050365
§ 371 (c)(1),
(2), (4) Date: Jul. 12, 2013

(87) PCT Pub. No.: WO2012/102078
PCT Pub. Date: Aug. 2, 2012

(65) Prior Publication Data
US 2013/0284313 A1    Oct. 31, 2013

(30) Foreign Application Priority Data

Jan. 28, 2011 (JP) ................................. 2011-016996
Feb. 17, 2011 (JP) ................................. 2011-032347

(51) Int. Cl.
*B29C 73/02* (2006.01)
*B60S 5/04* (2006.01)
(Continued)

(52) U.S. Cl.
CPC ............ *B29C 73/025* (2013.01); *B29C 73/166* (2013.01); *B60S 5/04* (2013.01); *B60S 5/046* (2013.01); *B29L 2030/00* (2013.01)

(58) Field of Classification Search
CPC ...... B29C 73/025; B29C 73/16; B29C 73/166
USPC .......................................... 141/37, 38, 67, 105
See application file for complete search history.

(56) References Cited

U.S. PATENT DOCUMENTS 2,731,195 A * 1/1956 Blome ........................... 141/383
3,515,181 A * 6/1970 Sperberg ........................ 141/38
(Continued)

FOREIGN PATENT DOCUMENTS

EP          528216 A1 *  2/1993 ............... B67C 3/28
JP     2000-108215 A     4/2000
(Continued)

OTHER PUBLICATIONS

PCT/ISA/210—International Search Report mailed on Feb. 7, 2012, issued in PCT/JP2012/050365.

*Primary Examiner* — Jason K. Niesz
*Assistant Examiner* — Andrew Schmid
(74) *Attorney, Agent, or Firm* — Birch, Stewart, Kolasch & Birch, LLP

(57) ABSTRACT

In the present invention, a difference between a pressure displayed by a manometer of a compressor device and an actual internal pressure of a tire can be reduced. A compressor device (2) and a bottle unit (3) are directly connected. A cap (6) attached to the bottle unit (3) comprises a unidirectional valve (14) for preventing a reverse flow of a flat tire sealing agent to the side of the compressor device. A cylinder (12) of the compressor device (2) is provided with a pump chamber (11), and a surge chamber (18) which receives the compressed air from the pump chamber through an exhaust valve (16), wherein a volume (Q2) of the surge chamber (18) is 1.0 to 3.0 times of the stroke volume of a piston (10) in the pump chamber (11).

3 Claims, 14 Drawing Sheets

(51) Int. Cl.
*B29C 73/16* (2006.01)
*B29L 30/00* (2006.01)

(56) References Cited

U.S. PATENT DOCUMENTS

| | | | | |
|---|---|---|---|---|
| 3,669,159 A * | 6/1972 | Owens, Jr. | | 141/1 |
| 4,270,585 A * | 6/1981 | Mette | | 141/37 |
| 5,924,463 A * | 7/1999 | Hsu et al. | | 141/313 |
| 6,019,145 A * | 2/2000 | Savidge | | 141/38 |
| 6,283,172 B1 * | 9/2001 | Thurner | | 141/38 |
| 6,431,225 B1 * | 8/2002 | Dudley | | 141/38 |
| 6,766,834 B1 * | 7/2004 | Eckhardt | | 141/38 |
| 6,789,581 B2 * | 9/2004 | Cowan et al. | | 141/38 |
| 7,028,720 B2 * | 4/2006 | Eckhardt | | 141/38 |
| 7,389,800 B2 * | 6/2008 | Hickman et al. | | 141/26 |
| 7,891,385 B2 * | 2/2011 | Yanagi et al. | | 141/38 |
| 8,020,588 B2 * | 9/2011 | Wang | | 141/38 |
| 8,201,586 B2 * | 6/2012 | Yoshida et al. | | 141/38 |
| 8,281,820 B2 * | 10/2012 | White | | 141/37 |
| 8,297,321 B2 * | 10/2012 | Chou | | 141/38 |
| 8,453,684 B2 * | 6/2013 | Lolli | | 141/38 |
| 8,505,591 B2 * | 8/2013 | Eckhardt | | 141/38 |
| 8,517,063 B2 * | 8/2013 | Kanenari et al. | | 141/38 |
| 8,596,310 B2 * | 12/2013 | Senno et al. | | 141/38 |
| 8,627,857 B2 * | 1/2014 | Chou | | 141/38 |
| 8,640,745 B2 * | 2/2014 | Ji | | 141/38 |
| 8,671,995 B2 * | 3/2014 | Chou | | 141/38 |
| 8,684,046 B2 * | 4/2014 | Kojima et al. | | 141/38 |
| 8,733,407 B2 * | 5/2014 | Eckhardt | | 141/38 |
| 8,746,292 B2 * | 6/2014 | Lolli et al. | | 141/38 |
| 8,857,477 B2 * | 10/2014 | Lolli et al. | | 141/38 |
| 2003/0024596 A1 * | 2/2003 | Kojima et al. | | 141/38 |
| 2005/0284536 A1 * | 12/2005 | Kojima et al. | | 141/38 |
| 2006/0272731 A1 * | 12/2006 | Takeda | | 141/38 |
| 2008/0264540 A1 * | 10/2008 | Dowel | | 152/509 |
| 2009/0301602 A1 * | 12/2009 | Lolli et al. | | 141/38 |
| 2010/0071801 A1 * | 3/2010 | Sekiguchi | | 141/38 |
| 2010/0108185 A1 * | 5/2010 | Chou | | 141/38 |
| 2010/0186849 A1 * | 7/2010 | Yoshida et al. | | 141/38 |
| 2011/0290372 A1 * | 12/2011 | Dowel | | 141/37 |
| 2013/0000777 A1 * | 1/2013 | Kojima et al. | | 141/38 |
| 2013/0092286 A1 * | 4/2013 | Chou | | 141/38 |
| 2013/0199666 A1 * | 8/2013 | Nakao et al. | | 141/38 |
| 2013/0284313 A1 * | 10/2013 | Kojima et al. | | 141/38 |
| 2014/0099428 A1 * | 4/2014 | Paasch | | 427/8 |
| 2014/0190589 A1 * | 7/2014 | Kowalski | | 141/38 |
| 2014/0190590 A1 * | 7/2014 | Taniguchi et al. | | 141/38 |
| 2014/0209208 A1 * | 7/2014 | Taniguchi et al. | | 141/38 |
| 2014/0224380 A1 * | 8/2014 | Kono | | 141/37 |
| 2014/0224381 A1 * | 8/2014 | Nakao et al. | | 141/37 |
| 2014/0261878 A1 * | 9/2014 | Jhou | | 141/38 |
| 2014/0366981 A1 * | 12/2014 | Taniguchi et al. | | 141/38 |
| 2015/0000786 A1 * | 1/2015 | Taniguchi et al. | | 141/38 |

FOREIGN PATENT DOCUMENTS

| | | | | |
|---|---|---|---|---|
| JP | 2000108215 A * | 4/2000 | | B29C 73/02 |
| JP | 2008-932 A | 1/2008 | | |
| JP | 2010-18005 A | 1/2010 | | |
| JP | 2010018005 A * | 1/2010 | | |
| JP | 2010-274450 A | 12/2010 | | |
| JP | 2010-274596 A | 12/2010 | | |
| JP | 2010274450 A * | 12/2010 | | |
| JP | 2010274596 A * | 12/2010 | | |
| WO | WO 2010078626 A1 * | 7/2010 | | F16K 15/04 |

* cited by examiner

FIG.4
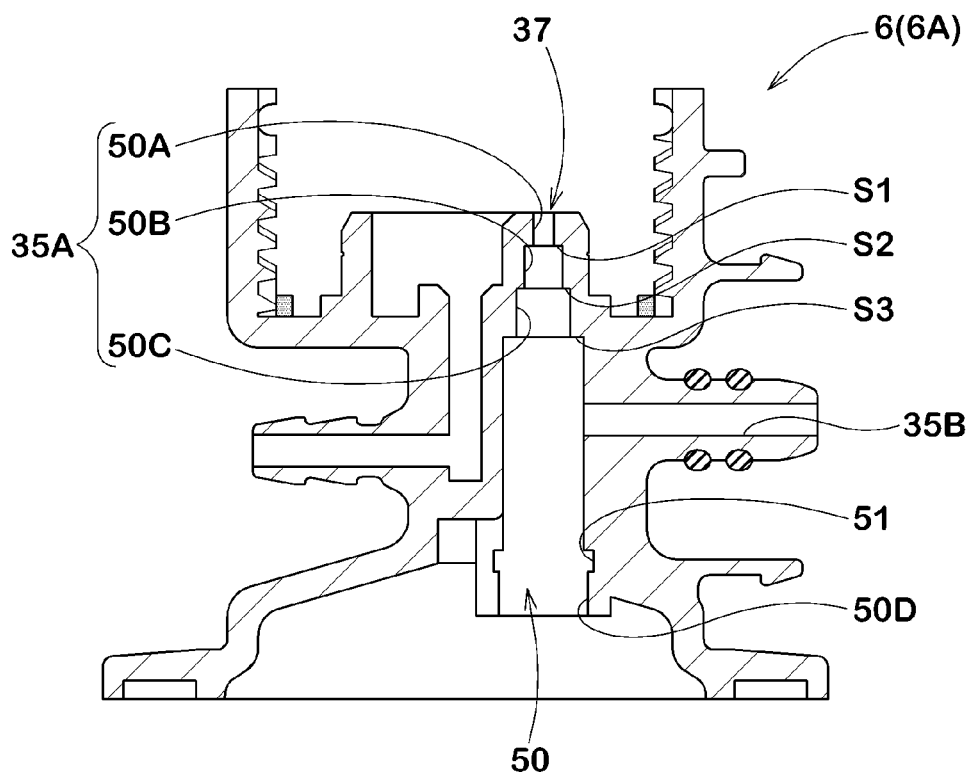
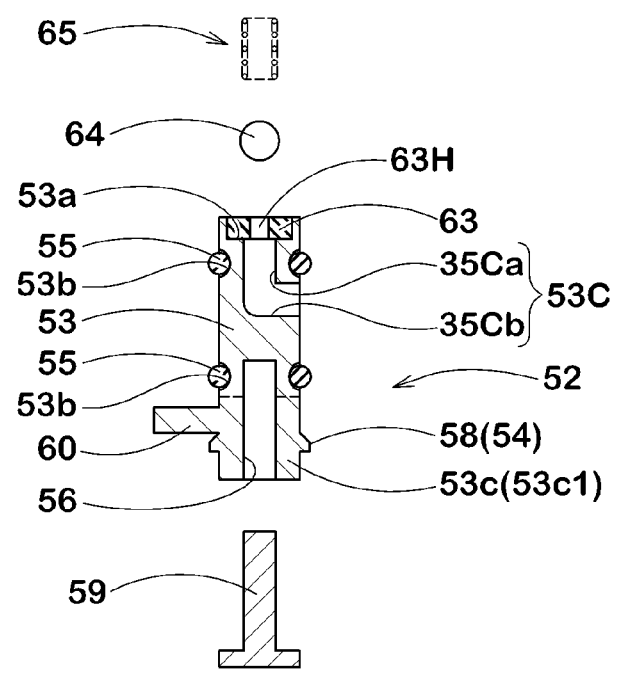

FLAT TIRE REPAIR KIT

TECHNICAL FIELD

The present invention relates to a flat tire repair kit for tire to inject puncture-sealing agent and compressed air in succession into a punctured tire and to repair the puncture as an emergency procedure.

BACKGROUND OF THE INVENTION

An example of a flat tire repair kit for repairing a puncture as an emergency procedure is the following Patent Document 1. Into a puncture tire, puncture-sealing agent and compressed air are injected in succession, and the punctured tire is pumped up; and in this state, owing to roll the tire, the puncture-sealing agent covers a whole circumference of a cavity surface of the tire so as to seal the puncture hole as the emergency procedure.

As shown in FIG. 14, such a repairing kit comprises a compressor device (a) and a bottle unit (d). The bottle unit (d) comprises a bottle container (b) enclosing puncture-sealing agent and a cap (c) attached to an opening of this bottle container (b). The cap (c) comprises an air intake port c1 to intake the compressed air from the compressed air discharge port into the bottle container (b), and a sealing agent/compressed air removal port c2 to remove in succession the puncture-sealing agent and the compressed air from the bottle container (b) by sending this compressed air. The air intake port c1 is connected with an air supply hose e1 from the compressor device (a). The sealing agent/compressed air removal port c2 is connected with a second of a feeding hose e2 of which first second is connected with the air valve of the tire T.

This repair kit comprises two hoses e1, e2, so that the horses are apt to be piped in the wrong. Because of poor stability of a bottle unit (d), there is a problem that the bottle unit (d) falls down while at work, and necessary quantity of puncture-sealing agent cannot be injected in the punctured tire.

Upon this, the present inventor proposed a structure of the air intake port c1 of the bottle unit (d) to connect directly to the compressor device (a). Hence, the bottle unit (d) and the compressor device (a) are integrally formed, and its center of gravity is low so as to increase the stability and to prevent the falling of the bottle unit. Moreover, as the hose e1 for air intaking is not required, there is no possibility of wrong piping. FIG. 13(A) is a conceptual diagram showing a part of an inside structure of this case. In FIG. 15(A), a drawing symbol (f) is a pump chamber to generate compressed air; a drawing symbol (g) is its piston; a drawing symbol (h) is a relief valve; a drawing symbol (i) is a manometer; a drawing symbol (j) is a unidirectional valve to prevent the puncture-sealing agent from flowing back from the bottle container (b) toward the compressor device (a); and a drawing symbol (k) is a passage from the discharge port f1 of the pump chamber (f) to the unidirectional valve (j).

However, when connecting the bottle unit (d) with the compressor device (a) directly, as shown in FIG. 13(B) for example, the inventor found that there was a large variance D between a pressure Pi displayed on the manometer (i) of the compressor device (a) and an actual internal pressure Pt of the tire T filled up by this compressed air. Specifically, there was a problem that the actual tire internal pressure Pt was higher than the pressure Pi displayed on the manometer (i) by about 100 kPa, for example, when leaving the compressor device (a) on and pumping up a puncture repaired tire up to a relief pressure of the relief valve (h). At this time, there was no safety hazard because the tire did not get any pressure beyond the ability of the compressor device (a), but it might give a user a sense of uncertainty and unease.

The inventor studied about the source of trouble of the variance D and found the following sources:

(a.) A pressure fluctuation of the compressed air caused by reciprocatory motion of the piston (g);
(b.) The unidirectional valve (j) to prevent the puncture-sealing agent from flowing back from the bottle container (b) toward the compressor device (a); and
(c.) A decrease in volume of the passage (k) owing to the direct connection.

That is to say, the decrease in volume of the passage (k) caused a large pressure fluctuation of the compressed air in this passage (k). And, since the unidirectional valve (j) was provided, a higher compressed air pressure than the relief pressure of the large pressure fluctuation flew into the tire through the unidirectional valve (j). However, the manometer (i) displayed the lower compressed air pressure of in the large pressure fluctuation, so that it was thought that the variance D generated. Therefore, preventing a pressure fluctuation width of the compressed air in the passage (k) as small as possible was required for the reduction of the variance D. Incidentally, there was not such a variance D when forming no unidirectional valve (j); however, in the case of the direct connection, the puncture-sealing agent flows back from the bottle container (b) since the passage (k) was short, and the compressor device (a) might be possibly damaged.

DISCLOSURE OF THE INVENTION

Problems to be Solved by the Invention

Patent Document 1: Japanese Unexamined Patent Application Publication No. 2000-108215.

DISCLOSURE OF THE INVENTION

Problems to be Solved by the Invention

Thereupon, the present invention is based on features that a cylinder comprises a surge chamber to store compressed air from a pump chamber via a exhaust valve and that the surge chamber volume is 1.0 to 3.0 times a stroke volume of a piston in the pump chamber.

And, it is an object of the present invention to provide a flat tire repair kit to prevent the pressure fluctuation range of the compressed air in the passage and to reduce the difference between the pressure displayed on the manometer of the compressor device and the actual tire internal pressure.

Means for Solving the Problem

To solve the above-mentioned problems, in claim 1 of the present application, a flat tire repair kit comprises a compressor device comprising a compressed air discharge port to discharge compressed air, and a bottle unit comprising a bottle container containing a puncture-sealing agent, and a cap provided on an opening of the bottle container. The cap comprises an air intake port capable of connecting directly to said compressed air discharge port and of sending the compressed air from the compressed air discharge port into the bottle container through a first flow channel, a sealing agent/compressed air outlet port to bring out in succession the puncture-sealing agent and the compressed air from said bottle container through the second flow channel by the sending of this compressed air, and the first flow channel provided with a unidirectional valve to prevent from the puncture-sealing agent from flowing back toward the compressor device. The compressor device comprises a cylinder comprising a pump chamber to compress the air with a back-and-forth motion of a piston and a surge chamber to receive the compressed air from the pump chamber via an exhaust valve. The surge chamber comprises an outlet to send the compressed air from the surge chamber to said compressed air discharge port, a manometer port to connect with a manometer to measure the pressure of the compressed air, and a relief valve connecting port to connect with relief valve to release overpressure. The surge chamber volume Q2 is set in a range of 1.0 to 3.0 times a stroke volume of the piston in said pump chamber.

The cylinder according to claim 2 comprises a cylinder main part provided integrally with a first cylindrical portion forming the pump chamber, and a second cylindrical portion which forms the surge chamber and of which one end connects to the first cylindrical portion via the partition, and a cylinder cap closing the second end of said second cylindrical portion. The surge chamber comprises a first protruding cylindrical portion protruding from the partition into the surge chamber and a second protruding cylindrical portion protruding from the cylinder cap into the surge chamber and outserted at an apical part of the first protruding cylindrical portion with a gap G, and the surge chamber is differentiated into a sub surge chamber surrounded by the first protruding cylindrical portion and the second protruding cylindrical portion, and a main surge chamber as the rest. The sub surge chamber is provided with said exhaust valve.

In claim 3, the exhaust valve comprises a valve opening arranged concentrically with the first protruding cylindrical portion and through the partition, a valve seat enabling to open-close the valve opening in the first protruding cylindrical portion, and a coiled bias power spring to bias the valve seat toward the valve opening.

Effect of the Invention

In the present invention, the cylinder comprises a surge chamber via an exhaust valve to receive and to store the compressed air from a pump chamber, where a reciprocal motion of the piston compresses the air. The surge chamber is large volumetric, and the surge chamber volume is set in a range of from 1.0 to 3.0 times the stroke volume of the piston in the pump chamber. This can lower a pressure fluctuation width of the compressed air in the surge chamber and can reduce the difference between the pressure displayed on the manometer of the compressor device and the actual tire internal pressure.

BRIEF EXPLANATION OF THE DRAWING

FIG. 4 is an exploded cross-sectional view of an inside structure of a cap.

BEST MODE FOR CARRYING OUT THE INVENTION

Hereinafter, preferred embodiments of the present invention will be concretely described.

Figure 1:
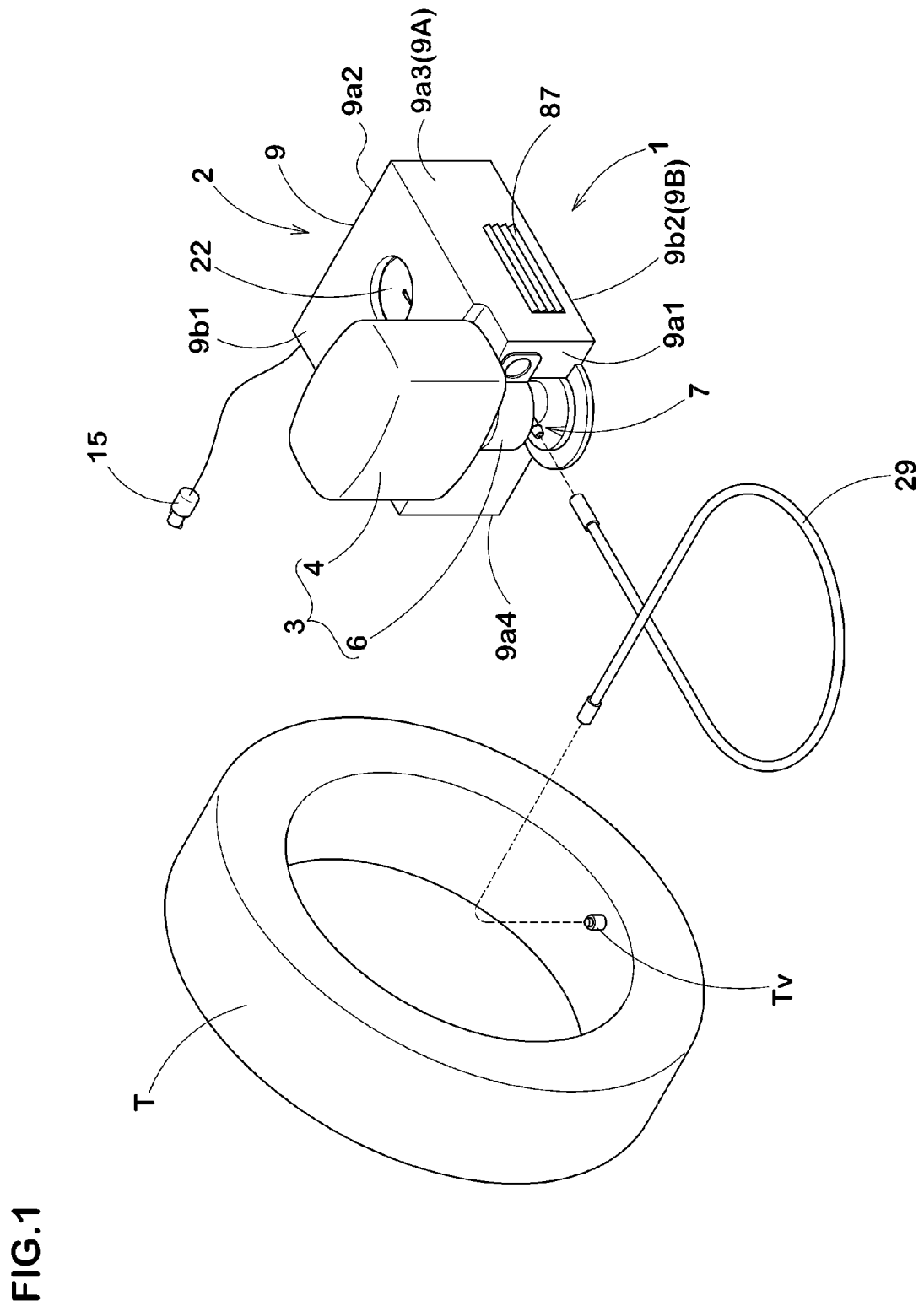
FIG. 1 is a perspective view showing a situation of puncture repairing by use of the flat tire repair kit of the present invention.

As shown in FIG. 1, a flat tire repair kit 1 of the first embodiment comprises a compressor device 2 and a bottle unit 3. The bottle unit 3 comprises a bottle container 4 containing puncture-sealing agent and a cap 6 attached to its opening 5 (shown in FIG. 3). The compressor device 2 and the bottle unit 3 are directly connected without hose and the like intervention at a repairing scene of tire puncture. One end of this feeding hose 29 of which the second end is connected to an air valve Tv of the tire T is previously connected to a sealing agent/compressed air removal port 7 disposed in the bottle unit 3. During storage, this feeding hose 29 is stored while keeping the connected state with the sealing agent/compressed air removal port 7, and the feeding hose is wrapped around the cap 6.

Figure 2:
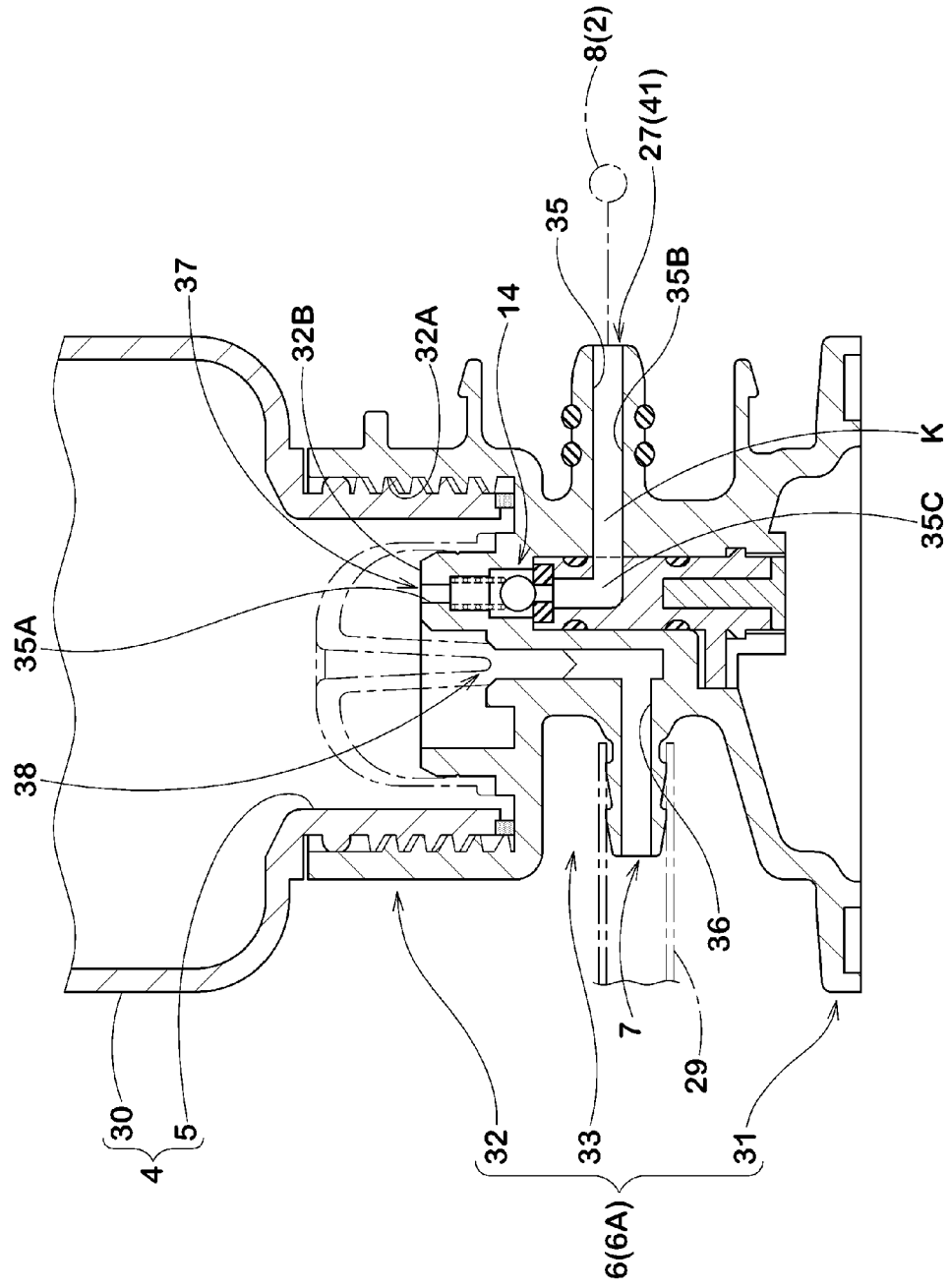
FIG. 2 is a cross-sectional view of a bottle unit.

As shown in FIG. 2, the bottle container 4 is provided in a lower end of a trunk portion 30 with a protruding small-diameter cylindrical opening 5 capable of taking the puncture-sealing agent in and out.

The cap 6 comprises the air intake port 27 being connectable directly with the compressed air discharge port 8 and sending the compressed air from the compressed air discharge port 8 into the bottle container 4, and the sealing agent/compressed air removal port 7 to bring out in succession the puncture-sealing agent and the compressed air from the bottle container 4 by sending this compressed air.

More particularly, the cap 6 comprises a cap main portion 6A comprising integrally a discoid basal plate 31 forming a basal plane, a bottle attaching part 32 to attach the opening 5 of the bottle container 4, and a waist part 33 disposed therebetween. And, in this cap main portion 6A, there are a first air flow passage 35 extending from the air intake port 27 into the opening 5 of the bottle container 4, and a second flow passage 36 extending from the sealing agent/compressed air removal port 7 into the opening 5 of the bottle container 4.

The bottle attaching part 32 comprises an attaching concave part 32A to fix the opening 5, and a boss portion 32B rising from a basal plane of this attaching concave part 32A. The attaching concave part 32A is capable of helically attaching the opening 5 provided in its sidewall face with an inside screw. And, the top surface of the boss portion 32B is provided with a first flow passage upper opening 37 where the top end of the first flow passage 35 opens, and with a second flow passage upper opening 38 where the top end of the second flow passage 36 opens.

The first flow channel 35 is provided with a unidirectional valve 14 to prevent the puncture-sealing agent from flowing back toward the compressor.

The first flow channel 35 comprises a vertical flow passage 35A extending inferiorly from an upper opening 37 of the first flow channel, a horizontal flow passage 35B extending laterally from the air intake port 27, and an L-shaped joint flow passage 35C connecting them. As shown in FIG. 4, the cap 6 comprises a vertical hole 50 extending inferiorly from the first flow channel upper opening 37, comprising steps of which inside diameters increases in stages. This vertical hole 50 comprises a first vertical hole 50A extending inferiorly from the first flow channel upper opening 37, a second vertical hole 50B connecting with this first vertical hole 50A via a first stepped face S1, a third vertical hole 50C connecting with this second vertical hole 50B via a second stepped face S2, and a fourth vertical hole 50D connecting with this third vertical hole 50C via a third stepped face S3.

The lower end of the fourth vertical hole 50D opens in a basal plane of the cap main part 6A and is provided on the lower end side with a locking groove 51 extending circumferentially.

The first to third vertical holes 50A to 50C form a vertical flow passage 35A. Inside the fourth vertical hole 50D, a valve seat case 52 is inserted from the lower end of the fourth vertical hole 50D.

The valve seat case 52 comprises a column-shaped basal portion 53 inserted in the fourth vertical hole 50D. The basal portion 53 is provided in the upper second with a valve seat attaching concave portion 53a for a valve seat 63. The basal portion 53 is provided in the lower end with a retaining device 54 to prevent falling out from the fourth vertical hole 50D by interlocking the locking groove 51. The valve seat 63 has a ring-like shape comprising a valve hole 63H. This valve seat 63 is made of a hard rubber elasticity in the present embodiment and is held between the third stepped face 53 and a basal plane of the valve seat attaching concave portion 53a.

The basal portion 53 comprises the joint flow passage 35C. This joint flow passage 35C comprises a vertical joint flow passage 35Ca which opens in the basal plane of the valve seat attaching concave portion 53a and is conducted with the vertical flow passage 35A via the valve hole 63H; and a horizontal joint flow passage 35Cb which is bent on its lower end, opens on an outer circumferential surface of the basal portion 53, and conducts with the horizontal flow passage 35B.

Around the basal portion 53, there are formed ring-attaching grooves 53b, 53b having a cross-section semicircle shape to attach an O-shaped ring 55 for sealing between the basal portion 53 and the fourth vertical hole 50D. The O-shaped rings 53b are disposed both high and lower positions than the opening of the horizontal joint flow passage 35Cb. Therefore, the horizontal flow passage 35B and the joint flow passage 35C are connected densely.

Figure 5A:
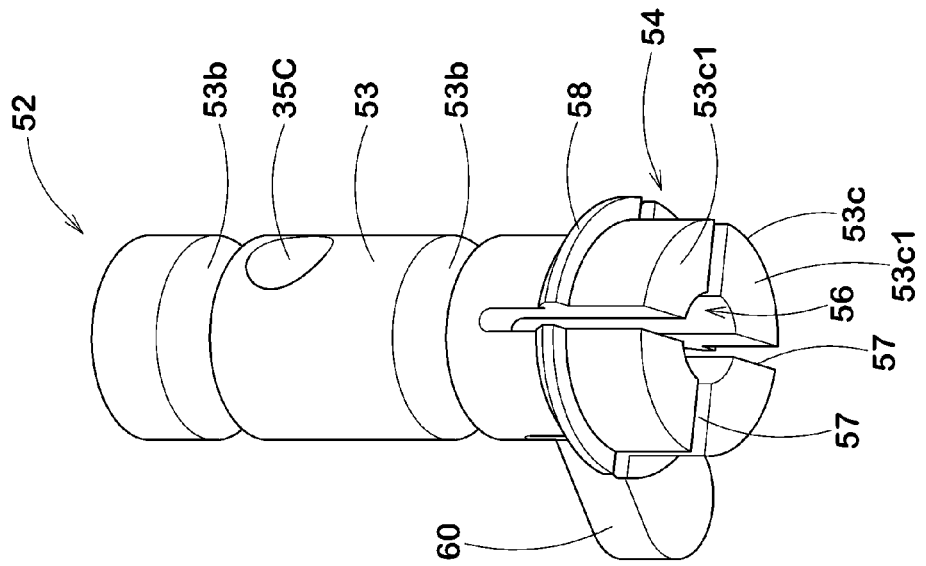
FIGS. 5(A) and (B) are a side view and a perspective view of a valve seat case.
Figure 5B:
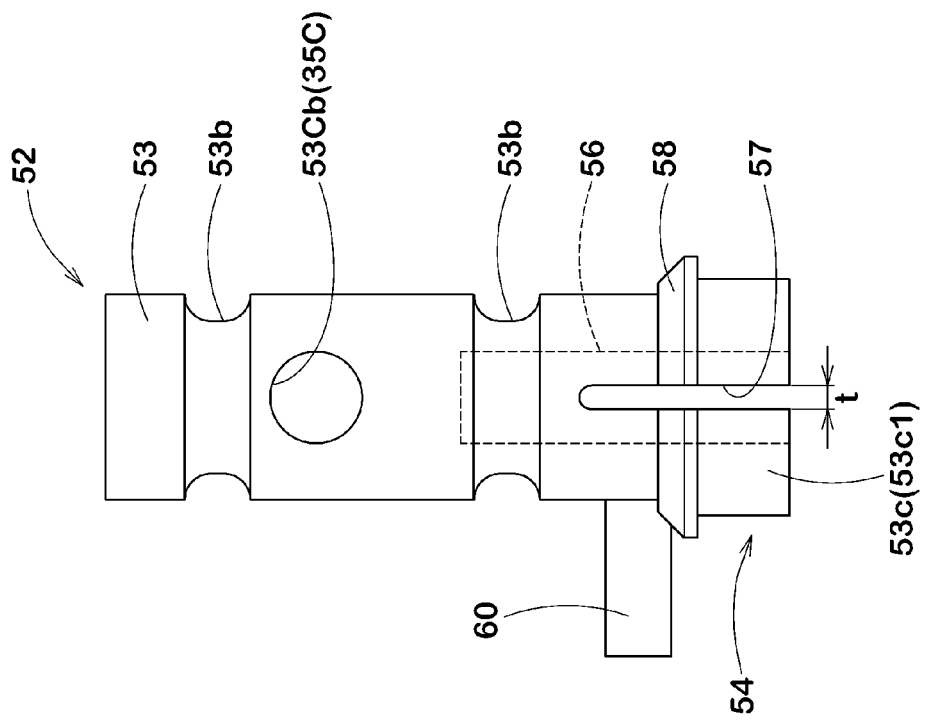

As shown in FIG. 5, the retaining device 54 comprises a central hole 56 extending superiorly along the shaft center from the lower end of the basal portion 53, plural of small-width slits 57 being capable of dividing an annular circumferential wall portion 53C disposed around this central hole 56 into plural circumferential fan-like pieces 53c1, a circumferential locking rib 58 protruding from an outer circumferential surface of each of the fan-like pieces 53c1 and being capable of interlocking with the locking groove 51.

The central hole 56 terminates lower than the joint flow passage 35C. The slit 57 extends superiorly from the lower end of the basal portion 53 in a radial fashion thereby dividing the circumferential wall portion 53C into plural of fan-like pieces 53c1, which are elastically deformable radially inside and outside. The retaining device 54 of the present embodiment comprises a connecting shaft 59 connecting with the central hole part 56, as shown in FIG. 4(B). This connecting shaft 59 prevents a radially inward elastic deformation of the fan-like piece 53c1 and prevents the interlocking separation of the locking rib 58 from the locking groove 51. The valve seat case 52 comprises a lever-like protrusion 60 protruding from the outer circumferential surface of the basal portion 53, for example. This protrusion 60 prevents the valve seat case 52 from turning over and is used for a position adjustment between an opening of a horizontal flow passage 35B and an opening of a horizontal joint flow passage 35Cb while inserting the valve seat case 52 into vertical hole 50.

As shown in FIG. 4, a unidirectional valve 14 comprises a valve seat 63, a ball-like spherical valve 64 which is movably inserted into the third vertical hole 50C and can open and close a valve hole 63H of the valve seat 63, and a bias power spring 65 disposed in a second vertical hole 50B and energizes the spherical valve 64 toward the valve seat 63.

As shown in FIG. 2, the air intake opening 27 according to the present embodiment is a connecting nozzle 41 protruding from the waist part 33 toward the compressed air discharge port 8. This connecting nozzle 41 is directly connected with a joint concave portion 28 which is the above-mentioned compressed air discharge port 8.

Figure 3:
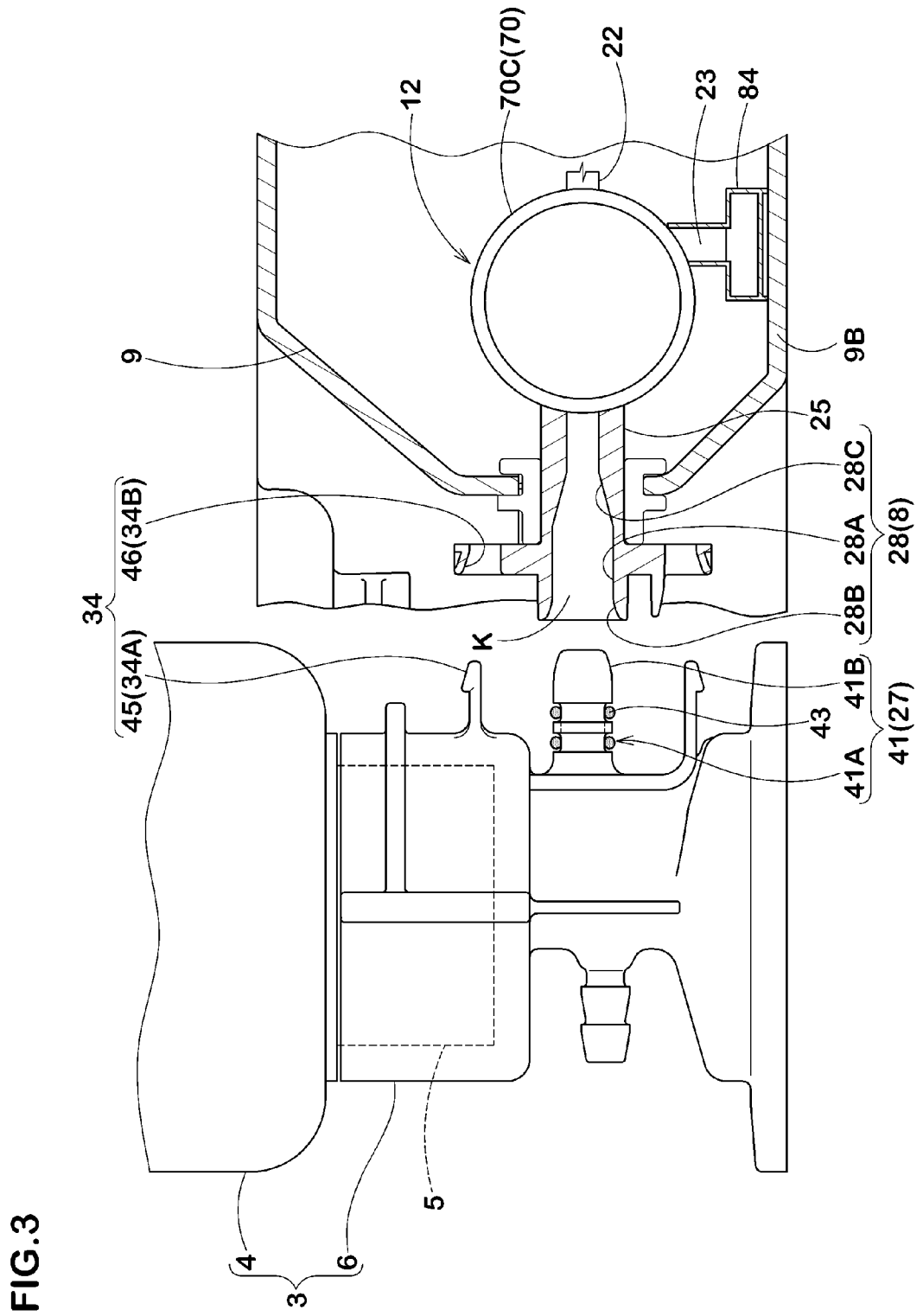
FIG. 3 is a partial cross sectional view of a situation before connecting the bottle unit with a compressor device.

As shown in FIG. 3, the connecting nozzle 41 is provided with a tapered surface 41B having a tapered cone-shape on a tip second of the nozzle main body 41A having a constant outer diameter. The connecting nozzle 41 is provided around the nozzle main body 41A with an O-shaped ring 43 sealing between the connecting nozzle and an inner surface of the joint concave portion 28. The O-shaped ring 43, consumable supply, is arranged on the bottle unit 3; and this helps to use the compressor device 2 repeatedly without maintenance.

The flat tire repair kit 1 of the present embodiment is provided with a securing device 34 to prevent getting its environment dirty with the puncture-sealing agent because of disconnection between the compressed air discharge port 8 and the air intake port 27 under repairing of the punctured tire.

This securing device 34 comprises a locking device 34A disposed in the cap 6, and a retaining device 34B formed in the compressor device 2. In the present embodiment, the locking device 34A is provided with a pair of locking clicks 45 protruding on the both sides (in the present embodiment, upper and lower) of the connecting nozzle 41 of the air intake port 27 toward the compressor device 2. And each of the locking clicks 45 is provided at a tip with a right-triangle-shaped hook. In the present embodiment, the retaining device 34B comprises a click interlocking hole 46 disposed at a position facing to the locking click 45 and being capable of preventing from falling-off by interlocking with the locking click 45.

Figure 6:
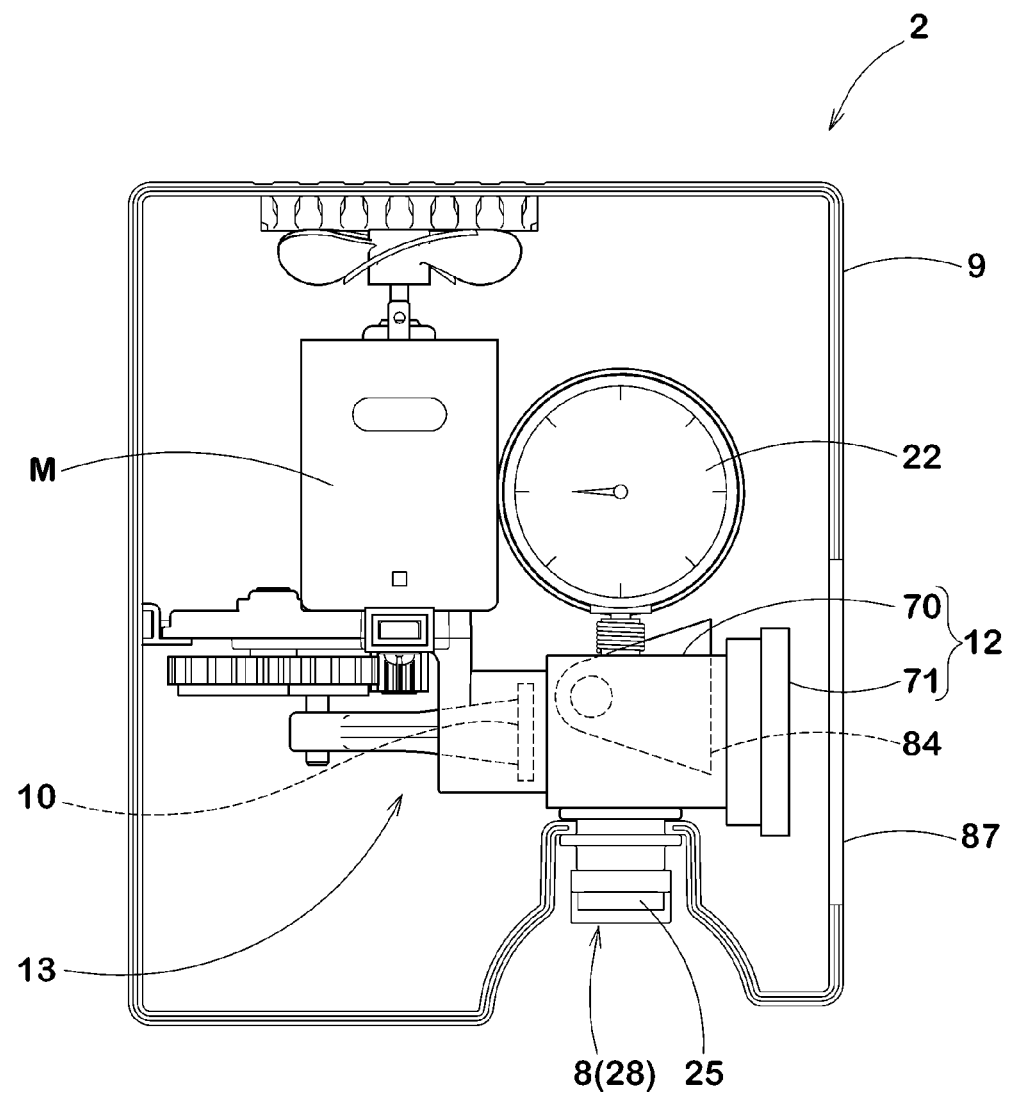
FIG. 6 is a plan view of an inside structure of a compressor device.

As shown in FIG. 6, the housing 9 of the compressor device 2 comprises at least a motor M and a compressor body 13.

As shown in FIG. 1, the housing 9 is a low box object comprising both sidewalls 9a1, 9a2; back and forth sidewalls 9a3, 9a4; and an upper side plate 9b1 and a lower side plate 9b2. The housing 9 is formed decomposable in upper and lower case parts. For the motor M, a commercial-release various DC motors powered direct current power supply of 12

V of an automobile can be employed. To this motor M, a power-supply cord is connected via an on-off switch attached to the upper side plate 9b1 of the housing 9. The power supply cord is provided at its tip with a plug for power supply 15 connectable to an automobile cigar lighter socket. The plug for power supply 15 can be contained in a recess (not shown) disposed in the lower side plate 9b2.

Figure 7:
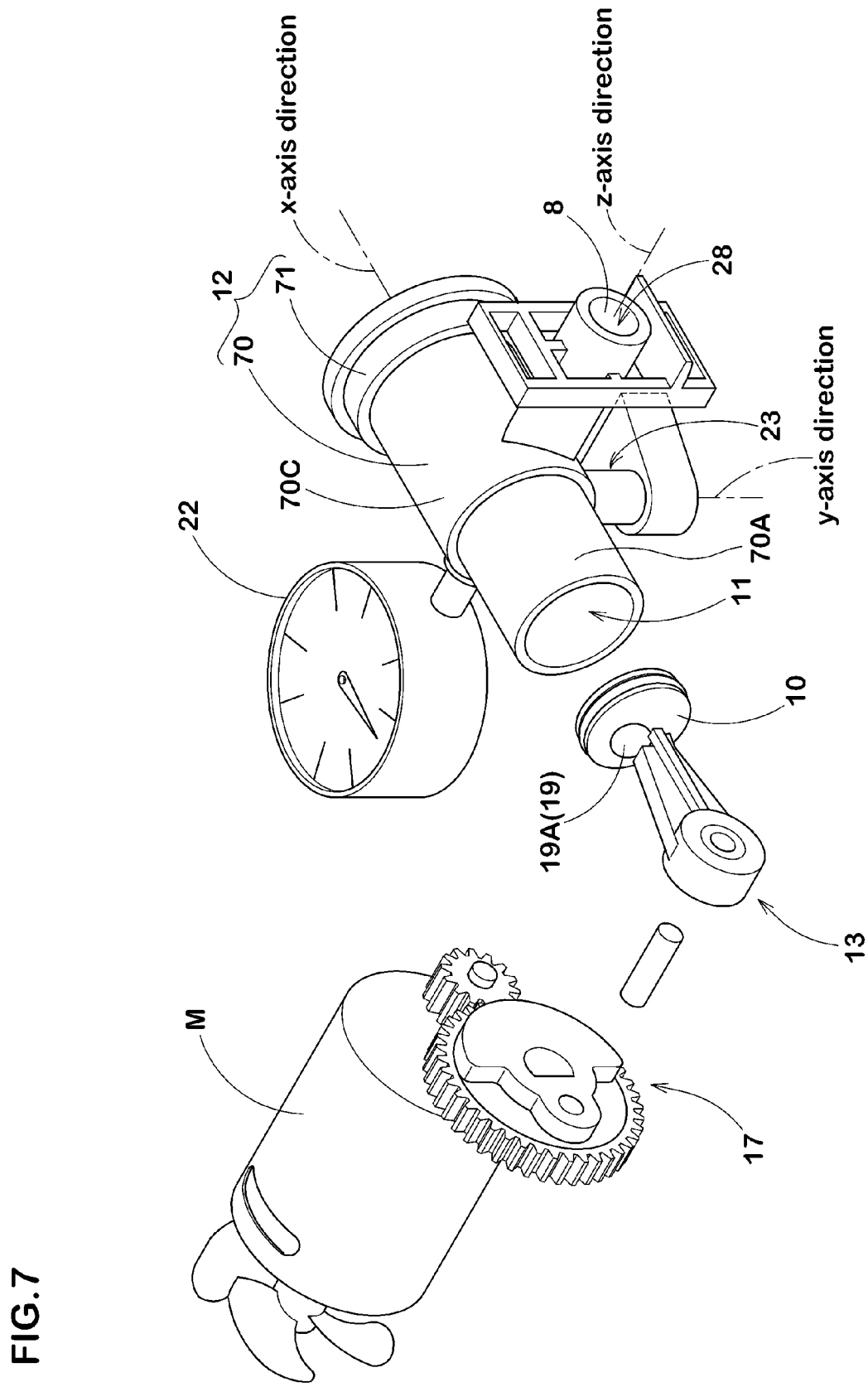
FIG. 7 is an exploded perspective view of a compressor device body.
Figure 8:
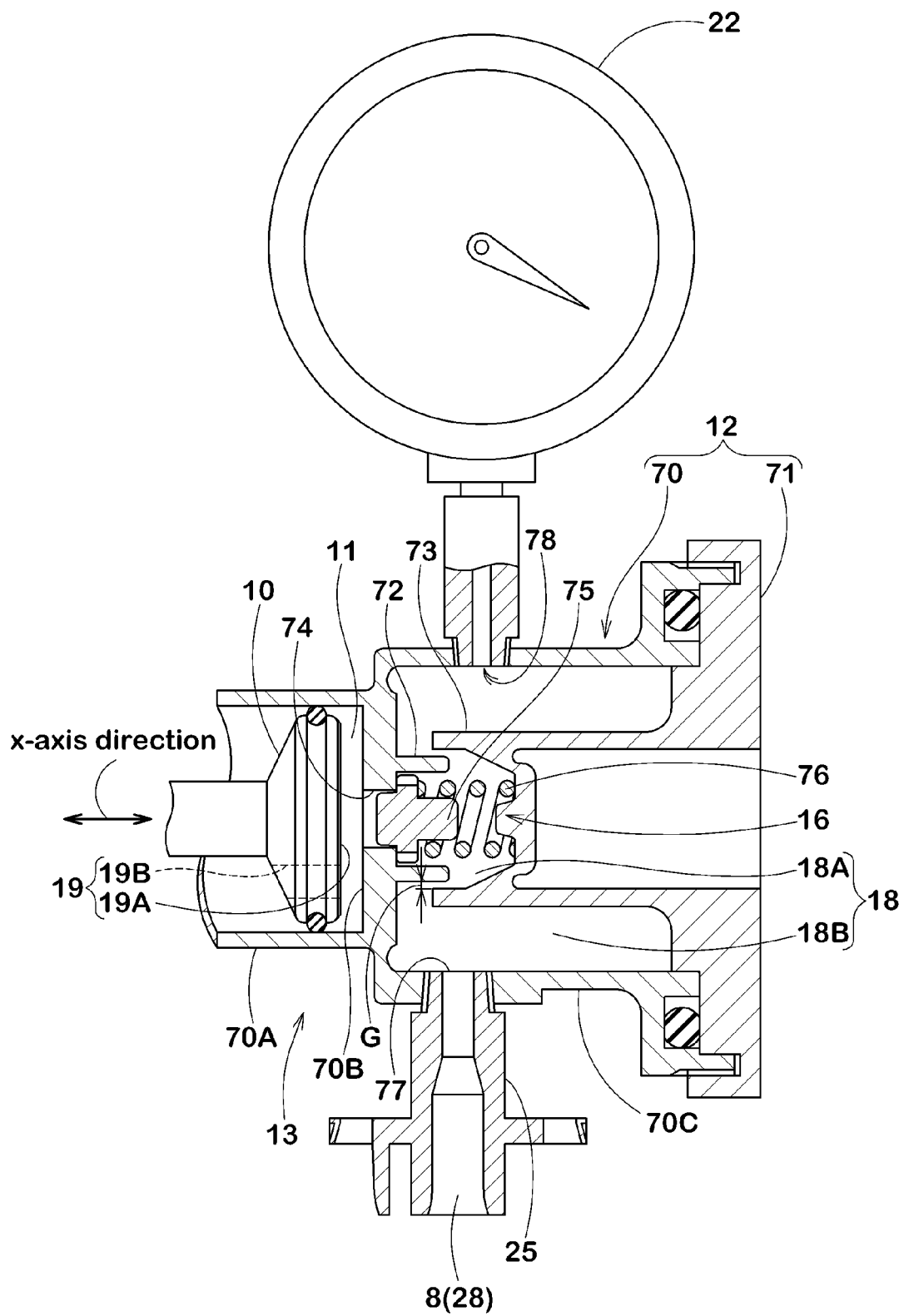
FIG. 8 is a partial perspective view of the compressor body.

As shown in FIGS. 7 and 8, the compressor main body 13 comprises a piston 10 connected to the motor M via a crank mechanism 17, and a cylinder 12. The cylinder 12 comprises a pump chamber 11 to compress the air by the reciprocal motion of the piston 10 and a surge chamber 18 via an exhaust valve 16 to receive the compressed air from the pump chamber 11. The piston 10 comprises an air intake valve 19 comprising an air intake hole 19A extending through this piston 10 in the direction of the shaft center, and a valve 19B closing this air intake hole 19A from the pump chamber side in spring property manner and formed of elastomer such as rubber, synthetic resin, metal and the like, for example.

The cylinder 12 comprises a cylinder main part 70 and a cylinder cap 71, in the present example. The cylinder main part 70 comprises a first cylindrical portion 70A forming the pump chamber 11, and a second cylindrical portion 70C of which first end connects to the first cylindrical portion 70A via a partition 70B and which forms the surge chamber 18. The cylinder cap 71 closes a second end of the second cylindrical portion 70c.

The partition 70B forms a first protruding cylindrical portion 72 protruding from the partition 70B into the surge chamber 18. The cylinder cap 71 comprises a second protruding cylindrical portion 73 protruding from the cylinder cap 71 into the surge chamber 18 and outserted at a tip of the first protruding cylindrical portion 72 with a gap G. Therefore, the surge chamber 18 is differentiated into a sub surge chamber 18A surrounded by the first protruding cylindrical portion 72, the second protruding cylindrical portion 73, and a main surge chamber 18B. The sub surge chamber 18A is connected with the main surge chamber 18B with having the gap G, and the sub surge chamber 18A comprises the exhaust valve 16.

The exhaust valve 16 comprises
a valve opening 74 arranged concentrically with the first protruding cylindrical portion 72 and through the partition 70B,
a valve seat 75 enabling to open-close the valve opening 74 in the first protruding cylindrical portion 72, and
a coiled bias power spring 76 to bias the valve seat 75 toward the valve opening.

The second cylindrical portion 70C comprises
an outlet 77 to discharge the compressed air from the surge chamber 18 to the compressed air discharge port 8,
a manometer port 78 connected with manometer 22 to measure the pressure of the compressed air, and
a relief valve connecting port 79 (shown in FIG. 9) connected with the relief valve 23 to let out the over pressured air. For the manometer 22, a well-known structure is preferably employed.

The outlet 77 is integrally connected with a connecting cylindrical portion 25 extending from the second cylindrical portion 70C through the housing 9. At its opening end, there is a joint concave portion 28 of the compressed air discharge port 8. As shown in FIG. 3, this joint concave portion 28 is connected with backward and forward tapered surfaces 28B, 28C tapered in cone-like fashion toward the second cylindrical portion 70C in front and back of a parallel hole part 28A having a constant inner diameter. The backward tapered surface 28C inclines substantially the same as the tapered surface 41B of an apex of the connecting nozzle 41 and contacts with the tapered surface 41B so as to arrange the connecting nozzle 41 and the joint concave portion 28 concentrically and accurately. The forward tapered surface 28B works as a way while inserting the connecting nozzle 41.

In the comprising the compressor device 2, there arises a large difference in pressure (variance D) between the actual internal pressure Pt of the pumped up tire and the pressure Pi displayed on the manometer 22. To prevent the occurrence of this variance D, the volume Q2 of the surge chamber 18 is set to larger than usual, 1.0 to 3.0 times the stroke volume Q1 of the piston 10 in the pump chamber 11. The pressure difference (variance D) is caused by pressure fluctuation of the compressed air arisen from back-and-forth motion of the piston 10.

The stroke volume Q1 means a volume difference of the pump chamber 11 between the most backward position and the most forward position of the piston 10. The pressure difference (variance D) is caused by pressure fluctuation of the compressed air arisen from back-and-forth motion of the piston 10. The volume Q2 of the surge chamber 18 means a sum of a volume Q2B of the main surge chamber 18B and a volume Q2A of the sub surge chamber 18A. The volume Q2A of the sub surge chamber 18A is obtained by reducing the content of the exhaust valve 16 from a volume without the exhaust valve 16.

When volume Q2 of the surge chamber 18 is less than 1.0 times the stroke volume Q1, the pressure fluctuation of the compressed air is insufficiently released in the surge chamber 18, and the variance D between the indicated pressure Pi of the manometer 22 and the actual internal pressure of tire Pt cannot be sufficiently reduced. When the volume Q2 of the surge chamber 18 is over 3.0 times the stroke volume Q1, the reducing effect of the variance D stagnates, and any further effect is not expected. And, the increase of the volume Q2 causes disadvantages such as cost rise and size growing of the cylinder 12.

In the present embodiment, the compressor device 2 differentiates the surge chamber 18 into a main surge chamber 18B and a sub surge chamber 18A, and they are connected through the gap G. Therefore, the pressure fluctuation of the compressed air in the main surge chamber 18B can be suppressed much better, and the variance D can be reduced. The gap G is preferably in a range of 0.5 to 2.0 mm.

Figure 9:
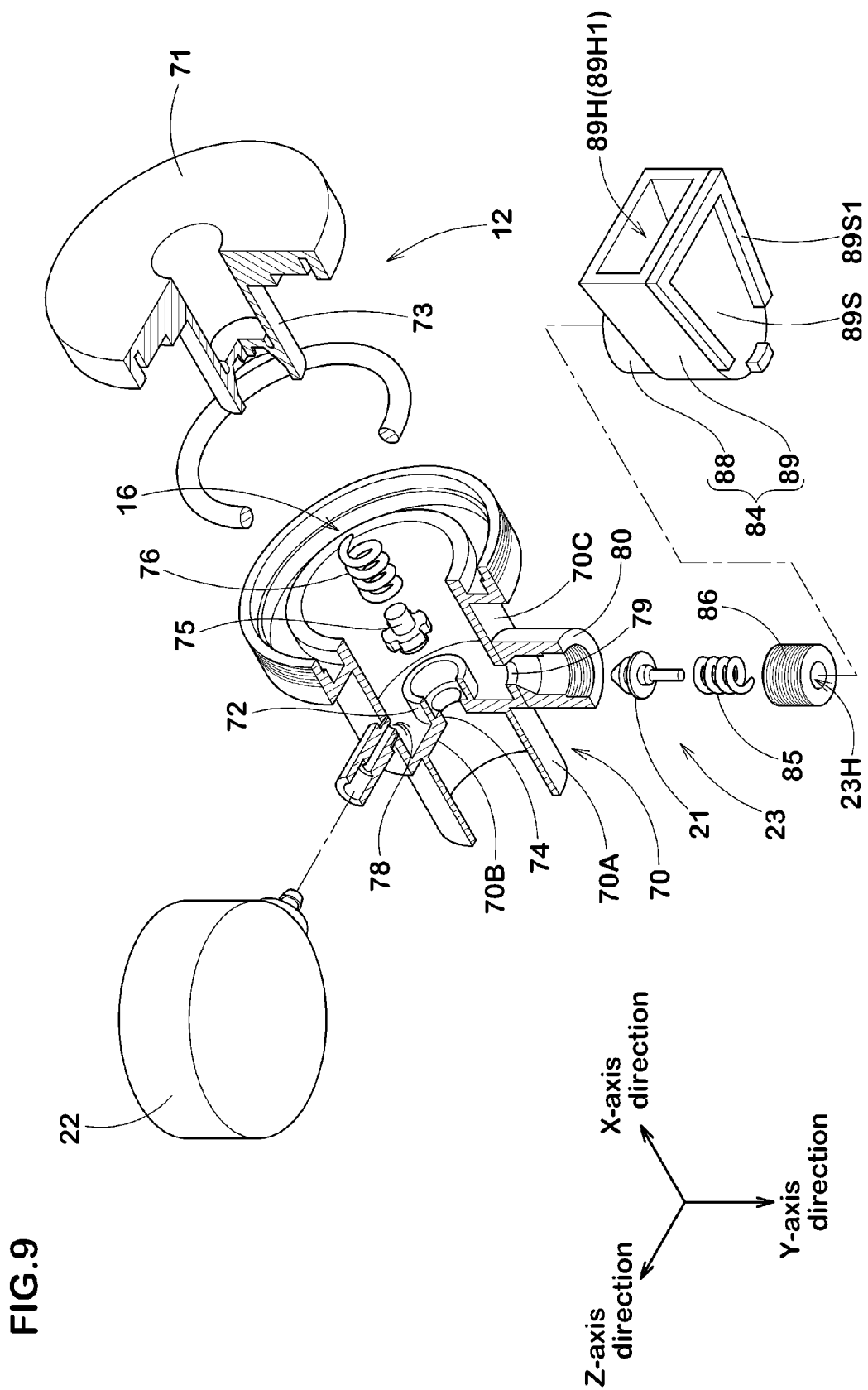
FIG. 9 is an exploded perspective view of a cylinder.

As shown in FIG. 9, the relief valve 23 of the present embodiment is a cylinder protruding from the second cylindrical portion 70C in the y-axis direction, which is in a direction perpendicular to the shaft-center direction (x-axis direction) of the cylinder 12. The relief valve 23 is provided at a protruding end with a valve outlet 23H to discharge the over pressured air. The valve outlet 23H opens toward a facing plate 9B comprising the upper side plate 9b1 or lower side plate 9b2.

Figure 10:
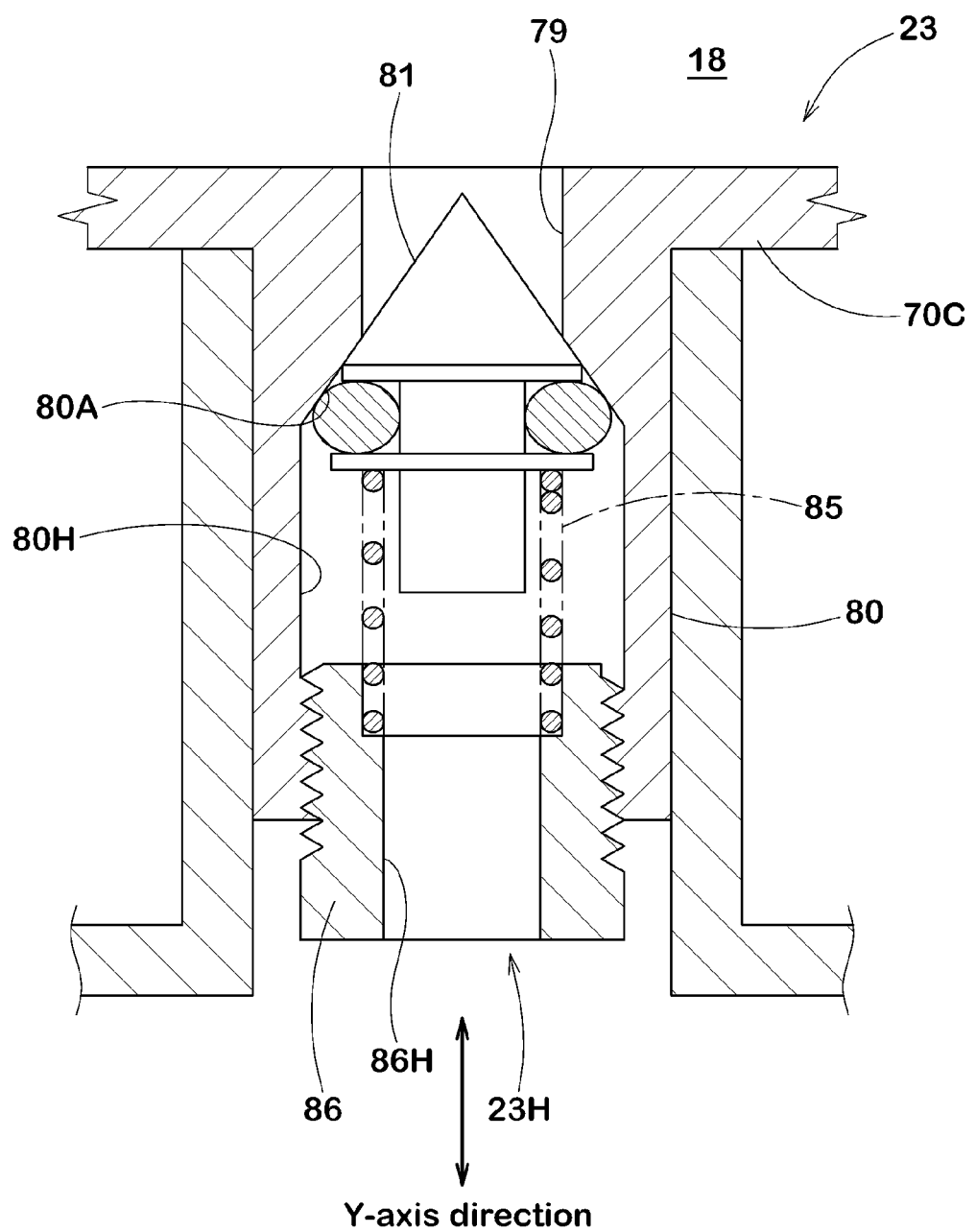
FIG. 10 is a cross-sectional view of a relief valve.

More particularly, as shown in FIG. 10, the relief valve 23 comprises integrally a cylinder body 80 protruding from the second cylindrical portion 70C in the y-axis direction. The cylinder body 80 has a central hole 80H of which first end connect with the surge chamber 18 through the relief valve connecting port 79. A second end of the central hole 80H opens toward the facing plate 9B (in the present embodiment, the lower side plate 9b2). There is a valve seat portion 80A between the first end and the second end.

In the central hole 80H, there are a valve shaft 81 to open and close the valve seat portion 80A, and a spring 85 to bias the valve shaft 81 toward the valve seat portion 80A. At the second end of the central hole 80H, attached is a spring holder 86 to hold the spring 85. The spring holder 86 is a threaded shaft, and its helical back-and-forth motion can adjust relief pressure. Incidentally, the spring holder 86 is provided with a concentric central hole 86H of which first end connects with the central hole 80H and of which second end forms the valve outlet 23H.

Figure 11A:
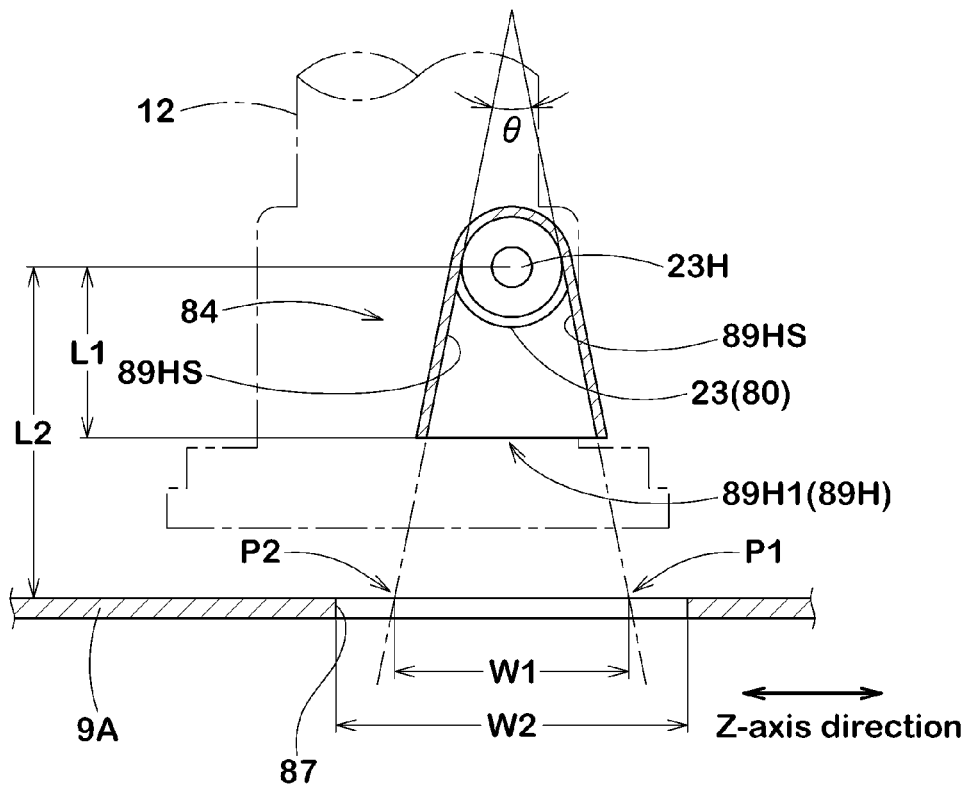
FIG. 11(A) is a cross-sectional view of a discharge cap viewed from its front.
Figure 11B:
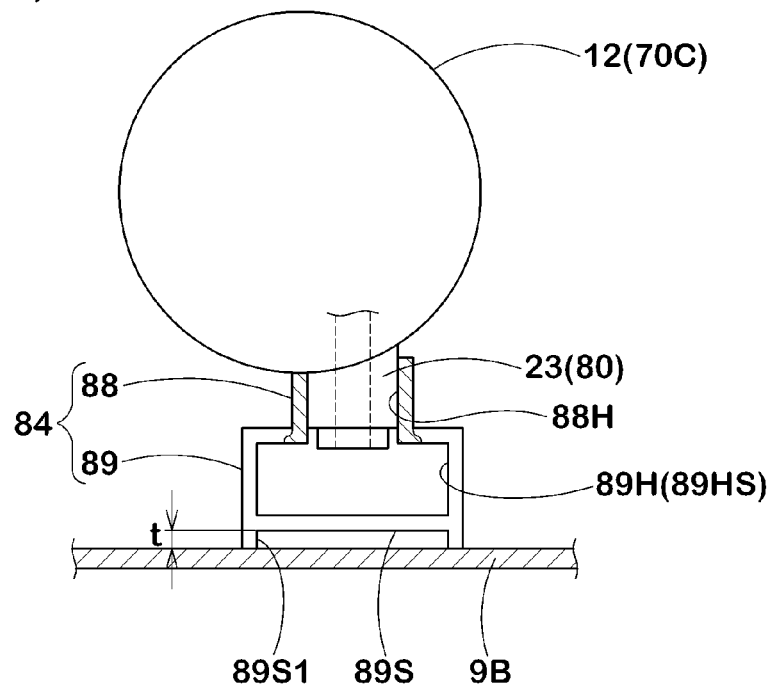
FIG. 11(B) is a cross-sectional view of it viewed from a side.
Figure 12:
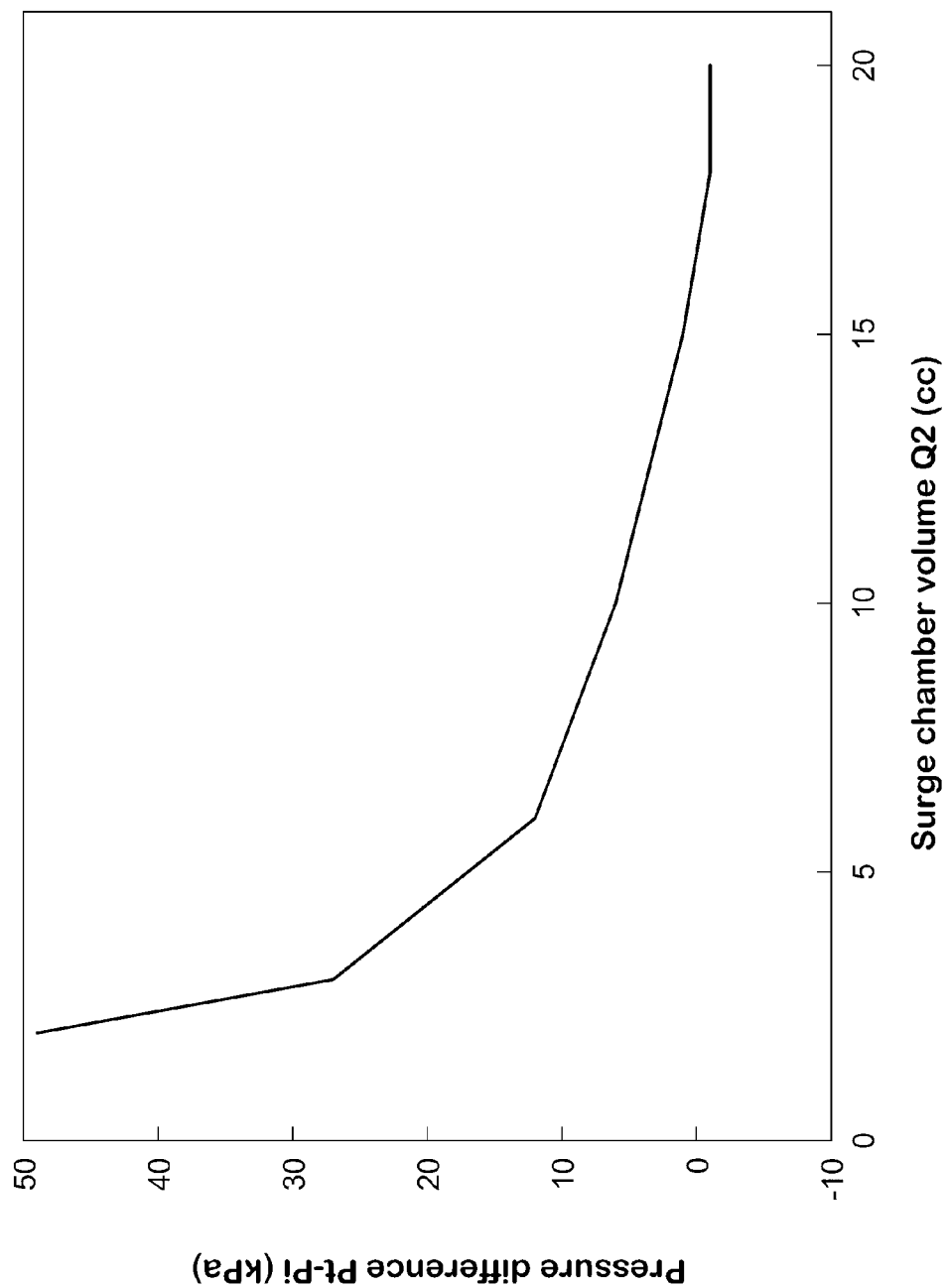
FIG. 12 is a graph showing the variation of a pressure displayed on a manometer and an actual tire internal pressure at a time of changing the volume of the surge chamber.
Figure 13A:
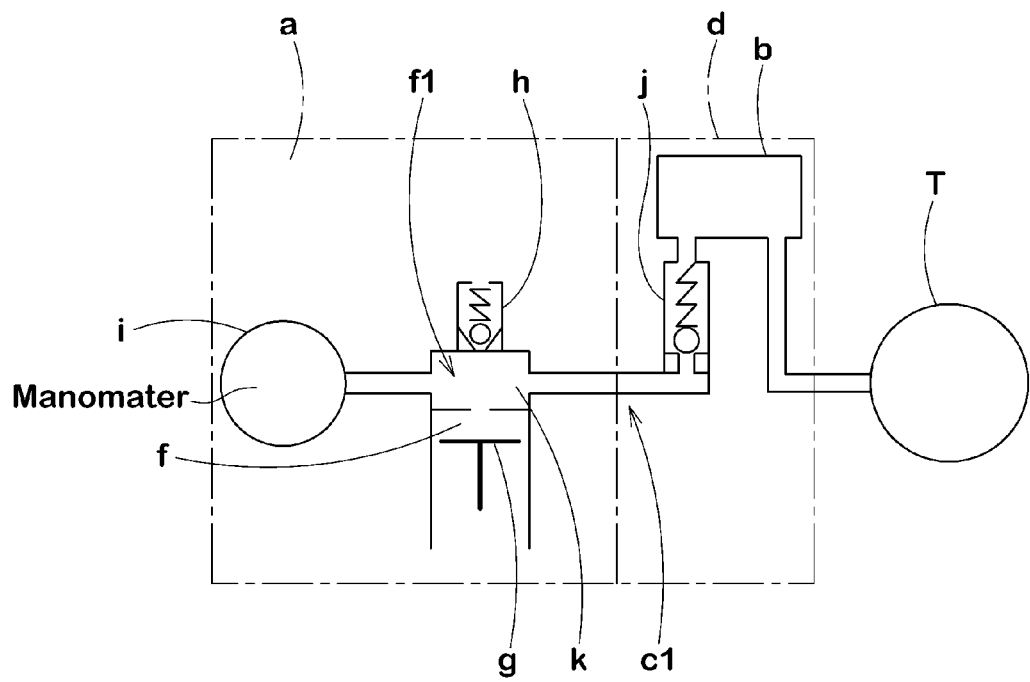
FIG. 13(A) is a conceptual diagram showing a portion of an inside structure of the repair kit connecting directly the bottle unit with the compressor device.
Figure 13B:
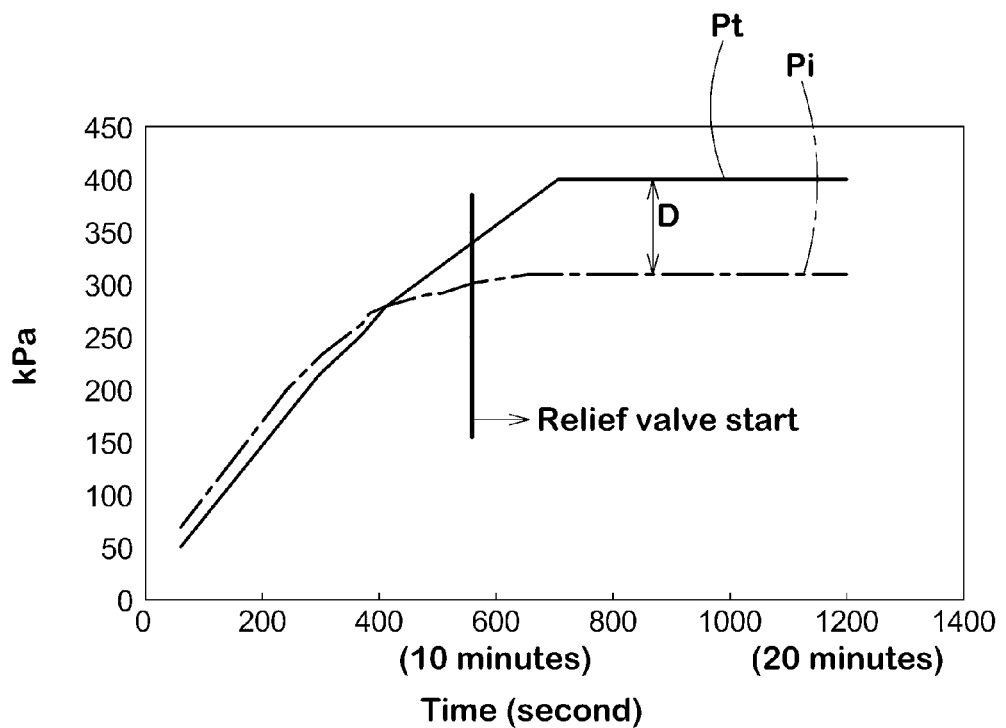
FIG. 13(B) is a graph of a pressure Pi displayed on a manometer and an actual tire internal pressure Pt showing a debatable point at the time.
Figure 14:
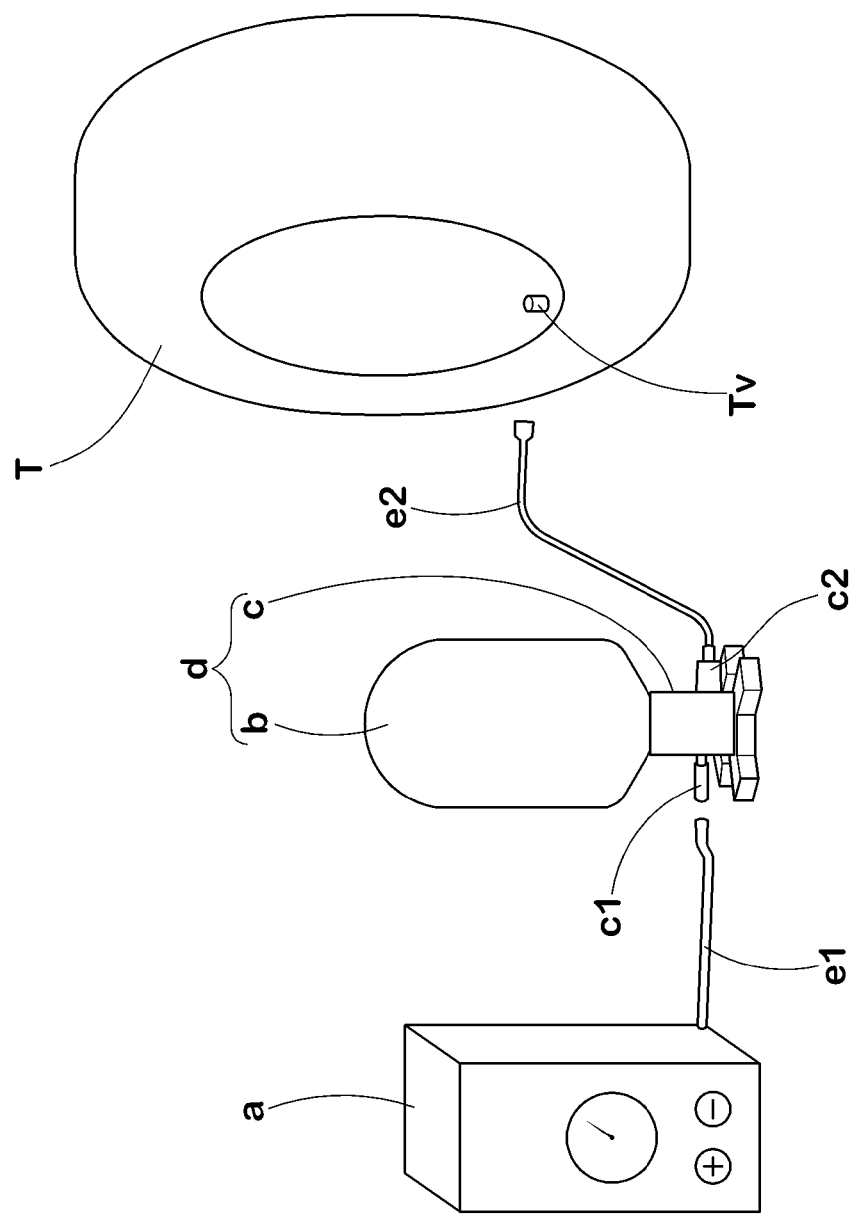
FIG. 14 is a perspective view explaining a conventional flat tire repair kit.

As shown in FIGS. 9 and 11, the discharge cap 84 is attached to the relief valve 23, changes the direction of the compressed air from the valve outlet 23H, and exhausts it from a case discharge port 87 (shown in FIGS. 1 and 11) which is arranged in the facing sidewall 9A formed with the sidewall 9a3 that is one of the sidewalls 9a3, 9a4.

In particular, the discharge cap 84 integrally comprises a screwing cylindrical portion 88 comprising a central hole 88H screwed to the cylinder body 80, and a hood portion 89. The hood portion 89 bends at a right angle from the central hole 88H, and extends toward the facing sidewall 9A. The hood portion 89 comprises a discharge flow passage 89H provided on edge with a rectangular cap discharge port 89H1 facing to the case discharge port 87.

In defining a direction which is perpendicular to the x-axis and the y-axis as a z-axis direction, both sides 89HS of the z-axis direction of the discharge flow passage 89H extends to the apex at an angle θ (theta) of from 10 to 60 degrees. The hood portion 89 comprises a protruding portion 89S1. The protruding portion 89S1 protrudes from the sidewall face 89S at a height (t) ranging 0.5 to 2.0 mm and contacts with the facing plate 9B so as to take the sidewall face 89S away from the facing plate 9B.

In the discharge cap 84, when defining intersection points where an extended line of the both sides 89HS of the discharge flow passage 89H intersects with the facing sidewall 9A as intersection point P1, P2, the intersection point P1, P2 are located in the case discharge port 87. A z-axial width w1 between the intersection point P1, P2 is in a range of from 0.5 to 1.0 times a z-axial width w2 of the case discharge port 87. An x-axial length L2 between the center of the relief valve 23 and the case discharge port 87 is in a range of from 1.5 to 3.0 times an x-axial length L1 between the center of the relief valve 23 and the cap discharge port 89H1.

In the discharge cap 84 having such a structure, the compressed air from the valve outlet 23H is changed the direction and exhausted from the case discharge port 87. That is to say, the compressed air is not discharged from the facing plate 9B near the valve outlet 23H but from the facing sidewall 9A perpendicular to the facing plate 9B. In consequence, the discharge flow passage 89H is long, and it is advantageous in cooling. Moreover, the discharge flow passage 89H extends in flaring at the angle θ (theta) so as to reduce the pressure of the high-temperature compressed air from the valve outlet 23H while passing in the discharge flow passage 89H and to cool. Therefore, a temperature of the case discharge port 87 and a temperature of the compressed air exhausted from the case discharge port 87 can be sufficiently lowered; it helps to prevent burns of a user. The discharge cap 84 does not exhaust the compressed air inside the apparatus inside, it helps to prevent an increase of internal temperature of the apparatus and a breakdown of the motor and the like.

When the angle θ (theta) of the discharge flow passage 89H is less than 10 degrees, an effect of reduced pressure is insufficient, and the temperature reduction becomes insufficient. When the angle θ (theta) is more than 60 degrees, part of the compressed air exhausted from the valve outlet 23H diffuses inside the apparatus, so that the inside temperature increase cannot be sufficiently curbed. When the intersection point P1, P2 are not arranged inside the case discharge port 87, that is to say, when the valve outlet 23H and the case discharge port 87 are misaligned, the part of the compressed air from the valve outlet 23H diffuses inside the apparatus, so that the inside temperature cannot be sufficiently increased.

When the width w1 between the intersection points P1, P2 is less than 0.5 times the width w2 of the case discharge port 87, and when the length L2 between the center of the relief valve 23 and the case discharge port 87 is less than 1.5 times the length L1 between the center of the relief valve 23 and the cap discharge port 89H1, the compressed air from the valve outlet 23H is efficiently exhausted from the case discharge port 87, so that it excels in the curb of the inside temperature increase but is insufficient to temperature increase of the compressed air from the case discharge port 87. However, when the width w1 is over 1.0 times the width w2, and when the length L2 is over 3.0 times the length L1, part of the compressed air from the valve outlet 23H diffuses inside the apparatus inside, and the inside temperature increase cannot be sufficiently curbed.

In the present embodiment, the hood portion 89 is provided on the sidewall face 89S with a protruding portion 89S1 so as to set the sidewall face 89S apart from the facing plate 9B. The hood portion 89 is subjected to high temperature caused by the compressed air from the valve outlet 23H. If there is no protruding portion 89S1, the heat is transferred from the sidewall face 89S to the facing plate 9B, the facing plate 9B rise to a high temperature, the user may be burned himself/herself on. However, they are apart owing to the protruding portion 89S1, the heat transfer is suppressed, and the heat increase of the facing plate 9B can be curbed. From the same perspective, the discharge cap 84 is preferably formed of rubber or plastic having low heat transference. The height of the discharge flow passage 89H is constant or increasing to the apex.

Although the especially preferred embodiments of the pneumatic tire and the method for manufacturing it in the present invention have been described in detail, needless to say, the invention is not limited to the above-mentioned concrete embodiments, and various modifications can be made.

To confirm the efficacy of the present invention, a flat tire repair kit comprising a bottle unit having a structure shown in FIG. 2 and a compressor device shown in FIG. 6 was manufactured for trial based on a specification shown in Table 1. The compressor device remained on, and a puncture repaired tire was pumped up to a relief pressure (350 kPa) of a relief valve. The relief valve turned on and 20 minutes later, an actual tire internal pressure Pt and a pressure Pi displayed on a manometer, and a pressure difference Pi–Pt was compared.

Comparative Example and Example have substantially the same specifications except for surge chamber volume. A volume of the passage between the outlet 77 of the cylinder 12 and unidirectional valve 14 of the cap 6 is 1.0 cc.

TABLE 1

|  | Com. Ex. 1 | Com. Ex. 2 | Ex. 1 | Ex. 2 | Ex. 3 | Ex. 4 | Ex. 5 | Ex. 6 | Com. Ex. 3 |
|---|---|---|---|---|---|---|---|---|---|
| Surge chamber volume Q2 <cc> | 2.0 | 3.0 | 6.0 | 8.0 | 10.0 | 12.0 | 15.0 | 18.0 | 20.0 |
| Piston stroke volume VO <cc> | 6.0 | 6.0 | 6.0 | 6.0 | 6.0 | 6.0 | 6.0 | 6.0 | 6.0 |
| (Q2/Q1) | 0.3 | 0.5 | 1.0 | 1.3 | 1.7 | 2.0 | 2.5 | 3.0 | 3.3 |
| Pressure difference Pt-Pi <kPa> | 49 | 27 | 12 | 9 | 6 | 4 | 1 | −1 | −1 |

From Examples of Table, it was confirmed that the difference between the pressure displayed on the manometer of the compressor device and the actual tire internal pressure could be reduced owing to enlarging the volume of the surge chamber.

The discharge cap having the specifications shown in Table 2 was attached to the relief valve, and the compressor device was kept working continuously for 20 minutes. The temperature at each position of that time was measured and compared one another. The specifications are substantially the same except for the discharge cap.

The relief pressure is set to 350 kPa, and the relief valve works after a lapse of 5 minutes. The each of the intersection points P1, P2 is disposed in the case discharge port. The case discharge port has a width w2 of 46 mm, a height of 65 mm, a length L2 from the center of the relief valve of 35 mm, constant. In Sample 1, without any discharge cap, the compressed air is exhausted into the apparatus inside from the valve exhaust port.

TABLE 2

|  | Sample 1 | Sample 2 | Sample 3 | Sample 4 | Sample 5 | Sample 6 | Sample 7 | Sample 8 |
|---|---|---|---|---|---|---|---|---|
| Discharge cap | absence | presence | presence | presence | presence | presence | presence | presence |
| Angle θ <degree> | — | 5 | 10 | 20 | 60 | 80 | 20 | 20 |
| Width W1 <mm> | — | 6 | 12.5 | 25 | 46 | 66 | 25 | 25 |
| (Ratio W1/W2) | — | 13% | 27% | 54% | 100% | 143% | 54% | 54% |
| Distance L1 <mm> | — | 18 | 18 | 18 | 20 | 20 | 23 | 12 |
| (Ratio L2/L1) | — | 190% | 190% | 190% | 200% | 200% | 150% | 300% |
| Outer surface temperature of cylinder <deg. C.> | 74 | 61 | 63 | 64 | 68 | 73 | 62 | 68 |
| Outer surface temperature of motor <deg. C.> | 61 | 50 | 52 | 53 | 56 | 60 | 51 | 56 |
| Temperature of valve exhaust port <deg. C.> | 134 | 134 | 134 | 134 | 134 | 134 | 134 | 134 |
| Ambient temperature of apparatus inside <deg. C.> | 56 | 46 | 48 | 49 | 51 | 55 | 47 | 51 |
| Temperature of case discharge port <deg. C.> | 45 | 73 | 69 | 66 | 59 | 47 | 69 | 60 |
| Air temperature <deg. C.> | 24 | 24 | 24 | 24 | 24 | 24 | 24 | 24 |

As shown in Table 2, Samples 3 to 5, 7, and 8 each having the angle θ1 (theta 1) of from 10 to 60 degrees, can exhaust the compressed air from the relief valve while decreasing it heat outside the apparatus. This may reduce the risk of the user burning himself/herself on and suppress inside temperature of apparatus.

EXPLANATION OF THE REFERENCE

1 Puncture repair kit
2 compressor device
3 Bottle unit
4 Bottle container
5 Opening
6 Cap
7 Sealing agent/compressed air outlet port
8 Compressed air discharge port
10 Piston
11 Pump chamber
12 Cylinder
14 Unidirectional valve
16 Exhaust valve
18 Surge chamber
18A Sub surge chamber
18B Main surge chamber
22 Manometer
23 Relief valve
27 Air intake port
35 First flow channel
36 Second flow channel
70A First cylindrical portion
70B Partition
70C Second cylindrical portion
70 Cylinder main body
71 Cylinder cap
72 First protruding cylindrical portion
73 Second protruding cylindrical portion
74 Valve opening
75 Valve seat
76 Bias power spring
77 Outlet
78 Manometer connecting port
79 Relief valve connecting port

The invention claimed is:

1. A flat tire repair kit comprising
a compressor device comprising a compressed air discharge port to discharge compressed air, and
a bottle unit comprising a bottle container containing a puncture-sealing agent and a cap provided on an opening of the bottle container; wherein:
said cap comprises an air intake port capable of connecting to said compressed air discharge port and capable of sending the compressed air from the compressed air discharge port into the bottle container through a first flow channel, a sealing agent/compressed air outlet port to bring out in succession the puncture-sealing agent and the compressed air from said bottle container through a second flow channel by the sending of this compressed air, and said first flow channel provided with a unidirectional valve to prevent from the puncture-sealing agent from flowing back toward the compressor device;
said compressor device comprises a cylinder comprising a pump chamber to compress the air with a back-and-forth motion of a piston and a surge chamber to receive the compressed air from the pump chamber via a unidirectional valve;
said surge chamber comprises an outlet to send the compressed air from the surge chamber to said compressed air discharge port, a manometer port to connect with a manometer to measure the pressure of the compressed air, and a relief valve connecting port to connect with relief valve to release overpressure;
said compressed air discharge port is formed at an opening end of a connecting cylindrical portion integrally connected with the cylinder;

said compressed air discharge port and said air intake port are directly connected, without an intervening hose; and said surge chamber volume (Q2) is set in a range of 1.0 to 3.0 times a stroke volume of the piston in said pump chamber.

2. The flat tire repair kit as set forth in claim 1, wherein:

said cylinder comprises a cylinder main part provided integrally with a first cylindrical portion forming the pump chamber, and a second cylindrical portion which forms the surge chamber and of which one end connects to the first cylindrical portion via a partition, and a cylinder cap closing the second end of said second cylindrical portion;

said surge chamber comprises a first protruding cylindrical portion protruding from the partition into the surge chamber and a second protruding cylindrical portion protruding from the cylinder cap into the surge chamber and outserted at an apical part of the first protruding cylindrical portion with a gap (G), and the surge chamber is differentiated into a sub surge chamber surrounded by the first protruding cylindrical portion and the second protruding cylindrical portion, and a main surge chamber as the rest; and said sub surge chamber is provided with said exhaust valve.

3. The flat tire repair kit as set forth in claim 2, wherein the exhaust valve comprises a valve opening arranged concentrically with the first protruding cylindrical portion and through the partition, a valve seat enabling to open-close the valve opening in the first protruding cylindrical portion, and a coiled bias power spring to bias the valve seat toward the valve opening.

* * * * *